US011038659B2

(12) United States Patent
Trainin et al.

(10) Patent No.: US 11,038,659 B2
(45) Date of Patent: *Jun. 15, 2021

(54) CROSS INDICATION OF QUEUE SIZE IN A REVERSE DIRECTION PROTOCOL

(71) Applicant: Intel Corporation, Santa Clara, CA (US)

(72) Inventors: Solomon Trainin, Haifa (IL); Michael Glik, Kfar Saba (IL); Ophir Edlis, Modiin (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/668,517

(22) Filed: Oct. 30, 2019

(65) Prior Publication Data

US 2020/0067682 A1 Feb. 27, 2020

Related U.S. Application Data

(63) Continuation of application No. 16/282,152, filed on Feb. 21, 2019, now abandoned, which is a
(Continued)

(51) Int. Cl.
*H04L 5/00* (2006.01)
*H04W 74/00* (2009.01)
(Continued)

(52) U.S. Cl.
CPC ............ *H04L 5/0055* (2013.01); *H04L 1/00* (2013.01); *H04L 1/1671* (2013.01);
(Continued)

(58) Field of Classification Search
CPC ............ H04W 72/0406; H04W 72/04; H04W 72/0446; H04W 72/1263; H04W 72/14;
(Continued)

(56) References Cited

U.S. PATENT DOCUMENTS 7,385,976 B2 6/2008 Gu et al.
8,687,580 B2 4/2014 Singh et al.
(Continued)

FOREIGN PATENT DOCUMENTS

CN 1943157 A 4/2007
CN 103329609 A 9/2013

OTHER PUBLICATIONS

Office Action for Chinese Application No. 201580063231.X, dated Aug. 4, 2020, 28 pages (includes 14 pages of english translation).
(Continued)

*Primary Examiner* — Un C Cho
*Assistant Examiner* — Rasha K Fayed
(74) *Attorney, Agent, or Firm* — Eversheds Sutherland (US) LLP

(57) ABSTRACT

This disclosure describes systems, methods, and computer-readable media related to cross indication of queue size in a reverse direction protocol. In some embodiments, a reverse direction (RD) grantor may transmit a frame to an RD responder. The RD responder may identify data to be transmitted to the RD grantor based on the received frame. The RD responder may generate a frame that may comprise a plurality of sub-frames. The RD responder may set a sub-field in each of the sub-frames indicating whether there is data to transmit. The RD responder may also set a second sub-field that may indicate a priority or traffic stream associated with the data to be transmitted. The RD responder may transmit the frame (and associated sub-frames) to the RD grantor.

20 Claims, 5 Drawing Sheets

Related U.S. Application Data continuation of application No. 14/581,131, filed on Dec. 23, 2014, now Pat. No. 10,263,750.

(51) Int. Cl.

| | |
|---|---|
| *H04L 1/00* | (2006.01) |
| *H04W 28/02* | (2009.01) |
| *H04L 1/16* | (2006.01) |
| *H04W 4/80* | (2018.01) |
| *H04W 80/02* | (2009.01) |
| *H04L 12/835* | (2013.01) |
| *H04W 74/06* | (2009.01) |
| *H04W 84/12* | (2009.01) |

(52) U.S. Cl.
CPC ..... *H04W 28/0268* (2013.01); *H04W 74/002* (2013.01); *H04L 47/30* (2013.01); *H04W 4/80* (2018.02); *H04W 74/06* (2013.01); *H04W 80/02* (2013.01); *H04W 84/12* (2013.01)

(58) Field of Classification Search
CPC . H04W 72/042; H04W 72/005; H04W 72/10; H04W 84/12; H04W 84/18; H04W 84/02; H04W 74/04; H04W 74/06; H04W 74/08; H04W 74/004; H04W 74/0833; H04W 74/002; H04W 52/0235; H04W 52/0216; H04W 52/0219; H04W 4/00; H04W 88/06; H04W 28/02; H04L 12/403; H04L 12/26; H04L 47/26; H04L 47/30; H04L 43/10; H04L 29/06; H04L 5/0055; H04L 1/00
See application file for complete search history.

(56) References Cited

U.S. PATENT DOCUMENTS

| | | | |
|---|---|---|---|
| 2005/0058101 A1* | 3/2005 | Khan | H04B 7/2618 370/335 |
| 2007/0037548 A1* | 2/2007 | Sammour | H04W 52/0235 455/343.2 |
| 2007/0058605 A1* | 3/2007 | Meylan | H04W 72/14 370/346 |
| 2007/0147284 A1* | 6/2007 | Sammour | H04W 72/14 370/328 |
| 2007/0201364 A1* | 8/2007 | Nakajima | H04L 1/1887 370/230 |
| 2007/0248117 A1* | 10/2007 | Zuniga | H04W 99/00 370/468 |
| 2012/0188973 A1* | 7/2012 | Meylan | H04W 74/06 370/329 |
| 2013/0034061 A1 | 2/2013 | Xie et al. | |
| 2013/0089047 A1* | 4/2013 | Wentink | H04W 74/06 370/329 |
| 2014/0036775 A1 | 2/2014 | Asterjadhi et al. | |
| 2014/0133495 A1* | 5/2014 | Viger | H04W 74/0816 370/442 |
| 2014/0269773 A1* | 9/2014 | Wentink | H04W 52/58 370/476 |
| 2016/0014803 A1* | 1/2016 | Merlin | H04H 20/55 370/236 |
| 2016/0119881 A1* | 4/2016 | Merlin | H04W 52/242 370/328 |

OTHER PUBLICATIONS

First Search for Chinese Application No. 201580063231.X (2 pages of english translation).

* cited by examiner

CROSS INDICATION OF QUEUE SIZE IN A REVERSE DIRECTION PROTOCOL

TECHNICAL FIELD

This application is a continuation of U.S. patent application Ser. No. 16/282,152 filed Feb. 21, 2018, which is a continuation of U.S. patent application Ser. No. 14/581,131, filed Dec. 23, 2014. The disclosures of which are incorporated by reference in their entireties.

BACKGROUND

As technology continues to improve and develop, user devices, such as cell phones, laptops, tablets, set top boxes, and the like, are increasingly equipped with wireless communication technologies and capable of transmitting and receiving digital media at increased capacities. Digital media may include video data, audio data, and the like, which may increase the traffic on the wireless networks.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
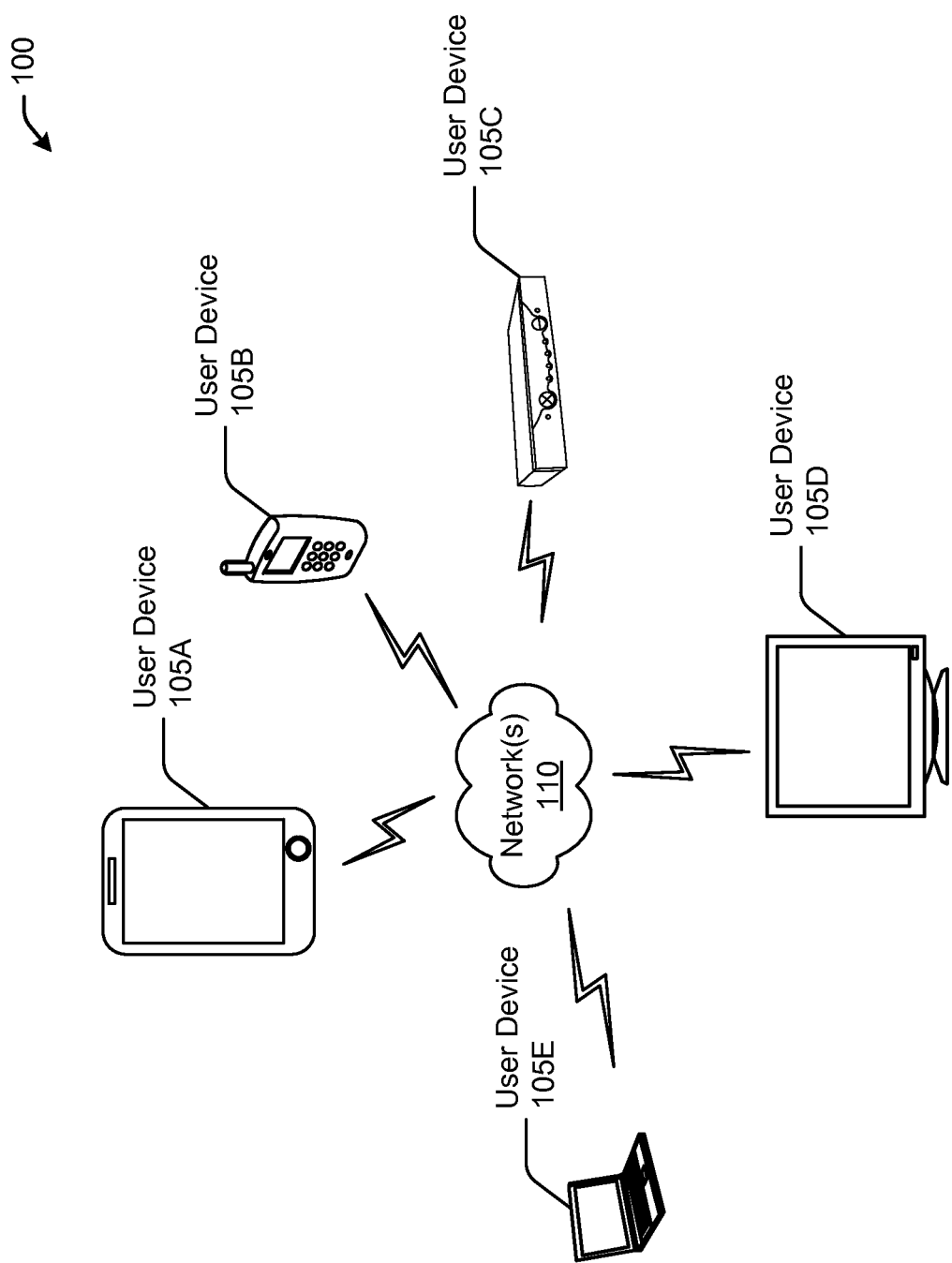
FIG. 1 depicts an illustrative data flow between various components of an illustrative system architecture for cross indication of queue size in a reverse direction protocol in accordance with one or more embodiments of the disclosure.

Recently, the 802.11 standards have been improved to provide enhanced performance of media access control to amortize the high cost of medium access over a larger number of data frames. One such improvement is the reverse direction protocol which may provide for a bi-directional transmission opportunity (TxOP). A TxOP is an interval of time when a particular quality-of-service (QoS) station (STA) has the right to initiate frame exchange sequences onto the wireless medium. A TxOP may be defined by a starting time and a maximum duration. The TxOP may be obtained by the STA by successfully contending for the channel or assigned by a hybrid coordinator (HC). An HC may be a type of coordinator, defined as part of the QoS facility, that implements the frame exchange sequences and medium access control (MAC) service data unit (MSDU) handling rules defined by a hybrid coordination function (HCF). The HC may operate during a contention period (CP) and contention-free period (CFP). A CFP is a time period during the operation of a point coordination function when the right to transmit data is assigned to stations solely by a PC, allowing frame exchanges to occur between members of the basic service set without contention for the wireless medium. A CP is the time period outside of the CFP in a point-coordinated basic service set. The HC may perform bandwidth management including the allocation of TxOPs to QoS stations.

This disclosure relates to, among other things, systems, methods, computer-readable media, techniques and methodology for cross indication of queue size in a reverse direction protocol (RDP). The RDP of the IEEE 802.11 standard (e.g., IEEE std. 802.11-2012, published Mar. 29, 2012) may substantially improve link utilization by eliminating excessive link access overhead that is necessary if the reverse direction (RD) responder does not use reverse direction. In some embodiments, RD may be useful in some types of access like CSMA/CA, contention based access period, service period or unicast contention based access period (UCBAP) where the allocation source is permitted to initiate transmission and plays the role of the RD grantor. The RD grantor may grant the RD responder with the data transmission rights despite the RD grantor not having data to transmit. However, existing solutions do not provide the RD grantor with an indication of whether the RD responder is ready to deliver data. Additionally, information associated with the data, including but not limited to a priority classification associated with the data and/or traffic stream identifier (TSID) associated with the data. The TSID may be any identifier usable by higher layer entities to distinguish media access control (MAC) service data units (MSDUs) to MAC entities for parameterized quality of service (QoS). In some embodiments, the RD grantor may optimize link access if such information was available. For example, the RD grantor may eliminate granting of specific UP or TSID if it receives an indication that no data is contained or available for transmission of the UP or TSID by the RD responder. In another example, the RD grantor may prioritize RD of higher priority data first if such priority classification information is available.

In some embodiments, the systems and methods described herein may provide queue indication in an RDP that is traffic identifier (TID) specific and not limited to the TID of the frame that contains the information. A TID may be any identifier usable by higher layer entities to distinguish media access control (MAC) service data units (MSDUs) to MAC entities that support QoS within the MAC data service. There are 16 possible TID values; eight identify traffic categories (TC). TCs may be labels for MSDUs that have a distinct user priority (UP), as viewed by higher layer entities, relative to other MSDUs provided for delivery over the same link. TCs may be meaningful only to MAC entities that support QoS within the MAC data service. These MAC entities may determine the user priority (UP) for MSDUs belonging to a particular traffic category using the priority value provided with those MSDUs at the MAC service access point. A UP may be a value associated with an MSDU that indicates how the MSDU is to be handled. In some embodiments, a station may respond with data of one TID and deliver an indication of the queue size of a different TID. A traffic stream (TS) may be a set of MSDUs to be delivered subject to the QoS parameter values provided to the MAC in a particular traffic specification. TSs may be utilized by MAC entities that support QoS within the MAC data service. The MAC entities may determine the traffic specification applicable for delivery of MSDUs belonging to a particular TS using the priority parameter provided with those MSDUs at the MAC service access point. In some embodiments, a traffic stream identifier (TSID) may be any identifier usable by higher layer entities to distinguish MSDUs to MAC entities for parameterized QoS (e.g., TS with a particular traffic specification) within the MAC data service. The TSID may be assigned to an MSDU in the layers above the MAC.

(e.g., the Internet), metropolitan area networks (MANs), wide area networks (WANs), local area networks (LANs), wireless personal area networks (WPANs), or personal area networks (PANs). In addition, the network(s) 110 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

Table 1 depicts illustrative existing formats of QoS control fields for a QoS Data frame and a QoS Null frame. A QoS Null frame is a subtype of data frame that does not deliver any data and may be used by RD Granter to provide RD grant to RD grantee.

TABLE 1

Example QoS Control Field for frames transmitted within a DMG PPDU

| Applicable Frame (sub-types) | Bits 0-3 | Bit 4 | Bits 5-6 | Bit 7 | Bit 8 | Bit 9 | Bits 10-14 | Bit 15 |
|---|---|---|---|---|---|---|---|---|
| QoS Data | TID | EOSP | Ack Policy | A-MSDU Present | A-MSDU Type | RDG/More PPDU | Reserved | AC Constraint |
| QoS Null | TID | EOSP | Ack Policy | Reserved | Reserved | RDG/More PPDU | Reserved | AC Constraint |

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Cases and System Architecture

FIG. 1 depicts an illustrative architecture 100 of various components of a system for cross indication of queue size in a reverse direction protocol (RDP) in accordance with one or more embodiments of the disclosure. Multiple user device(s) 105A-105E (collectively 105) communicative over one or more network(s) 110, are illustratively depicted in FIG. 1.

The user device(s) 105 may include any suitable processor-driven computing device capable of wireless telecommunication, including, but not limited to, tablet computing devices 105A, smart phones 105B, set top boxes (STB) 105C, web-enabled televisions 105D, laptop computers 105E, electronic book (e-book) readers, netbook computers, notebook computers, Ultrabook™ computers, personal digital assistants (PDA), video game consoles, digital video recorder (DVR) systems, wearable computers, or any combinations thereof. For ease of explanation, the user device(s) 105 may be described herein in the singular; however, it should be appreciated that multiple user device(s) 105 may be provided.

Any of the user device(s) 105 may be configured to communicate with each other via one or more network(s) 110. The network(s) 110 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 110 may have any suitable communication range associated therewith and may include, for example, global networks The following is an explanation of the different QoS control fields for a QoS Data frame:

Bits 0-3 (TID): The TID subfield may identify the TC or traffic stream (TS) to which the corresponding MAC served data unit (MSDU) or aggregate medium access control served data unit (A-MSDU) in the frame body field belongs. An MSDU may be the information that is delivered as a unit between MAC service access points. An A-MSDU may be a structure containing multiple MSDUs, transported within a single data MAC protocol data unit (MPDU). A TS may be a set of MSDUs to be delivered subject to the QoS parameter values provided to the MAC in a particular traffic specification. The TID subfield may also identify the TC or TS of traffic for which a TxOP is being requested, through the setting of frame duration field.

Bit 4 (EOSP): The end of service period (EOSP) subfield may be 1 bit in length and used by the HC to indicate the end of the current service period (SP). A service period may be a contiguous time during which one or more individually addressed frames are transmitted to a QoS station, SPs may be scheduled or unscheduled. The station may set the EOSP subfield to 1 in its transmission and retransmissions of the SP's final frame to signal end of a scheduled/unscheduled SP and sets it to 0 otherwise.

Bits 5-6 (Ack Policy): The Ack Policy subfield may be 2 bits in length and identify the acknowledgment policy that is followed upon the delivery of the MPDU.

Bit 7 (A-MSDU Present): The subfield may be 1 bit in length and indicate the presence of an A-MSDU, where the value 0 may indicate that the frame body field contains an MSDU whereas the value of 1 may indicate the frame body field contains an entire A-MSDU.

Bit 8 (A-MSDU Type): The subfield may be 1 bit in length and may indicate the type of A-MSDU present in the Frame Body.

Bit 9 (RDG/More PPDU): The reverse direction grant (RDG)/more physical layer convergence procedure (PLCP) protocol data unit (PPDU) subfield of the QoS Control field for DMG frames may be interpreted differently depending on whether it is transmitted by an RD initiator or an RD responder.

Bits 10-14 (Reserved): Uses of these reserved bits are explained in relation to Table 2, below.

Bit 15 (AC Constraint): this subfield may indicate whether the mapped AC of an RD data frame is constrained to a single AC.

A QoS control field of QoS Null frame is similar to the QoS data frame, except bits 7 and 8 may be reserved.

Table 2 depicts illustrative formats of re-defined subfields in the QoS control field of directional multi-gigabit (DMG) network. As illustrated, there may be two subfields: full and UP/TSID. The subfield full may be 1 bit size and may have value 0 or 1. Subfield full may be set to 1 when the queue identified in subfield UP/TSID contains not less than a queue threshold MPDUs and set to 0 otherwise. In other words, if the full subfield is set to 1, then there is data that can be transmitted to the RD grantor or requesting user device 105 and the UP/TSID is evaluated to determine a priority associated with the data of the frame to determine an order to transmit the data to the requesting device (e.g., RD grantor). If the full subfield is set to 0, then there is no data that is to be transmitted and the UP/TSID subfield is not evaluated. The queue threshold value may be preset by local administration or communicated between peers per UP/TSID. Subfield UP/TSID may be of 4 bit size and contain a UP value or TSID value of the queue associated with the information. The two subfields may be utilized by the RD responder. The RD grantor may use the two subfields for different purposes than described above.

TABLE 2

Sub-Fields in QoS Control Field

| Applicable Frame (sub-types) | Bit 10 | Bits 11-14 |
|---|---|---|
| QoS Data | full | UP/TSID |
| QoS Null | full | UP/TSID |

Figure 2:
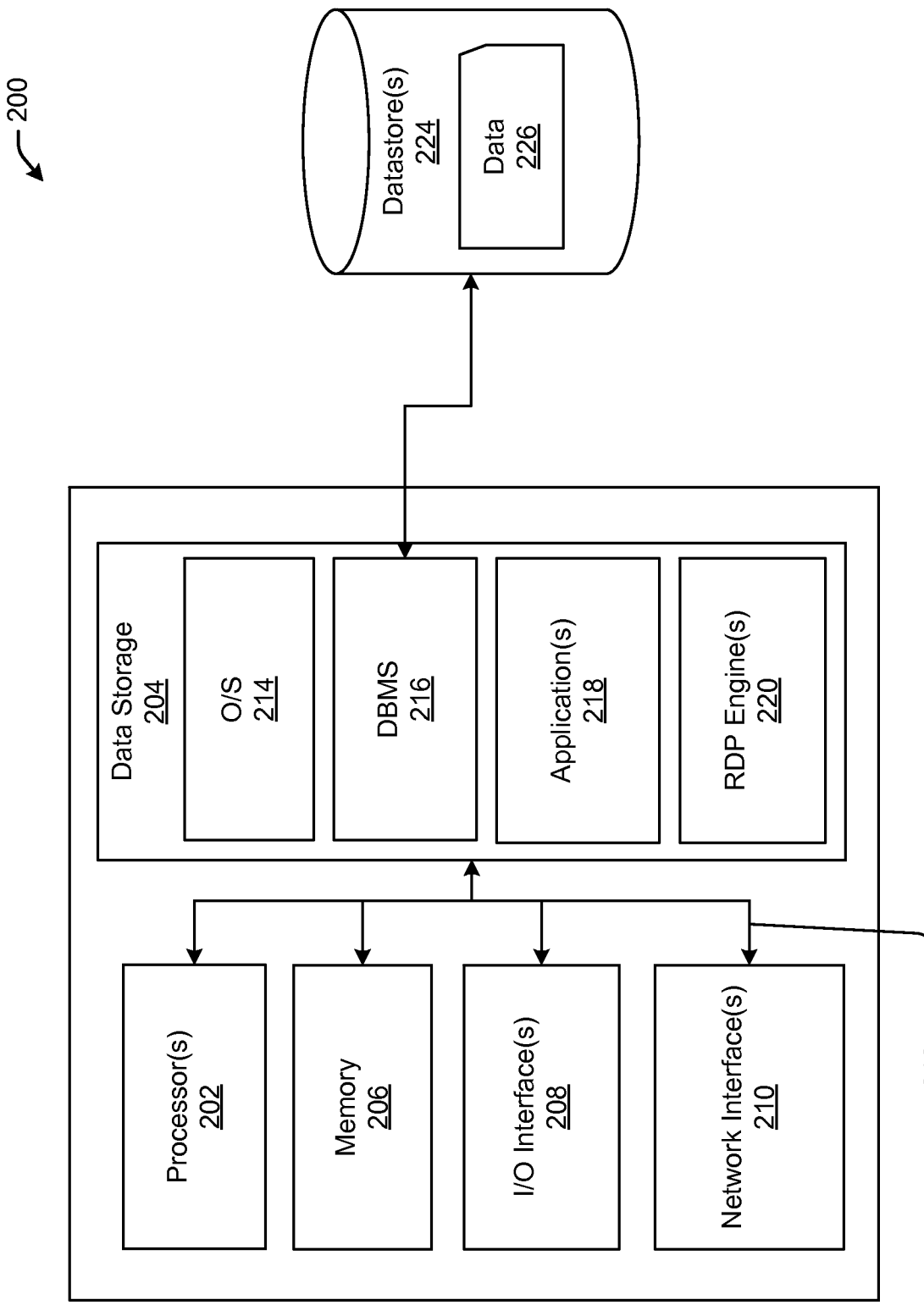
FIG. 2 is a block diagram including various hardware and software components of the illustrative system architecture depicted in FIG. 1 in accordance with one or more embodiments of the disclosure.

FIG. 2 is a schematic block diagram 200 of an illustrative user device 105 that may be used to perform any of the data processing and user device configuration described herein in accordance with one or more example embodiments of the disclosure. In an illustrative configuration, the user device 105 may include one or more processors (processor(s)) 202, one or more memory devices 206 (generically referred to herein as memory 206), one or more input/output ("I/O") interface(s) 208, one or more network interfaces 210, and data storage 204. The user device 105 may further include one or more buses 212 that functionally couple various components of the user device 105. In certain example embodiments, the user device 105 may be a mobile device that may include one or more antennas (not shown) including, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 212 may include at least one of a system bus, a memory bus, an address bus, or a message bus, and may permit exchange of information (e.g., data (including computer-executable code), signaling, etc.) between various components of the user device 105. The bus(es) 212 may include, without limitation, a memory bus or a memory controller, a peripheral bus, an accelerated graphics port, and so forth. The bus(es) 212 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 206 of the user device 105 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 206 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 206 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 204 may include removable storage and/or non-removable storage including, but not limited to, magnetic storage, optical disk storage, solid-state storage, and/or tape storage. The data storage 204 may provide non-volatile storage of computer-executable instructions and other data. The memory 206 and the data storage 204, removable and/or non-removable, are examples of computer-readable storage media (CRSM) as that term is used herein.

The data storage 204 may store computer-executable code, instructions, or the like that may be loadable into the memory 206 and executable by the processor(s) 202 to cause the processor(s) 202 to perform or initiate various operations. The data storage 204 may additionally store data that may be copied to memory 206 for use by the processor(s) 202 during the execution of the computer-executable instructions. Moreover, output data generated as a result of execution of the computer-executable instructions by the processor(s) 202 may be stored initially in memory 206, and may ultimately be copied to data storage 204 for non-volatile storage.

More specifically, the data storage 204 may store one or more operating systems (O/S) 214; one or more database management systems (DBMS) 216; and one or more program modules, applications, or the like such as, for example, one or more application(s) 218 and/or one or more RDP engine(s) 220. The data storage 204 may further store any of a variety of other types of modules. Further, any program modules stored in the data storage 204 may include one or more sub-modules. Further, any data stored in the data storage 204 may be loaded into the memory 206 for use by the processor(s) 202 in executing computer-executable code. In addition, any data potentially stored in one or more datastores 224 (e.g., data 226) may be accessed via the DBMS 216 and loaded in the memory 206 for use by the processor(s) 202 in executing computer-executable code.

The processor(s) 202 may be configured to access the memory 206 and execute computer-executable instructions loaded therein. For example, the processor(s) 202 may be configured to execute computer-executable instructions of the various program modules of the user device 105 to cause or facilitate various operations to be performed in accordance with one or more embodiments of the disclosure. The processor(s) 202 may include any suitable processing unit capable of accepting data as input, processing the input data in accordance with stored computer-executable instructions, and generating output data. The processor(s) 202 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 202 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 202 may be capable of supporting any of a variety of instruction sets.

Referring now to functionality supported by the various program modules depicted in FIG. 2, the application(s) 218 may include computer-executable instructions, code, or the like that, responsive to execution by one or more of the processor(s) 202, may obtain data, process and/or generate data, and present data to a user of the user device 105. In some embodiments, the application(s) 218 may obtain and/or receive data 226 from a datastore 224, remote server, or other user device 105.

The RDP engine(s) 220 may include computer-executable instructions, code, or the like that, responsive to execution by one or more of the processor(s) 202, may generate, transmit, and/or receive data frames. In some embodiments, the RDP engine(s) 220 may monitor a wireless medium, such as a wireless network, to determine when to transmit data. In some embodiments, the RDP engine(s) 220 (e.g., of an RD grantor) may receive data frames, such as QoS data frames or QoS null frames, from another device and may determine whether the user device 105 transmitting the data frames has data to transmit and, if so, a priority or traffic stream identifier associated with the data to be transmitted. In some embodiments, the RDP engine(s) 220 (e.g., of an RD responder or RD grantee) may determine there is data to transmit to another user device 105 and may generate data frames. The RDP engine(s) 220 may modify one or more subfields of the generated data frames to indicate that data is to be transmitted and to indicate a user priority (UP) and/or traffic stream identifier (TSID) associated with the data. In some embodiments, the RDP engine(s) 220 may generate and/or receive request frames, acknowledgment frames, and/or block acknowledgments.

Referring now to other illustrative components depicted as being stored in the data storage 204, the O/S 214 may be loaded from the data storage 204 into the memory 206 and may provide an interface between other application software executing on the device 105 and hardware resources of the device 105. More specifically, the O/S 214 may include a set of computer-executable instructions for managing hardware resources of the device 105 and for providing common services to other application programs (e.g., managing memory allocation among various application programs). The O/S 214 may include any operating system now known or which may be developed in the future including, but not limited to, any server operating system, any mainframe operating system, or any other proprietary or non-proprietary operating system.

The DBMS 216 may be loaded into the memory 206 and may support functionality for accessing, retrieving, storing, and/or manipulating data stored in the memory 206, data stored in the data storage 204, and/or data stored in the one or more datastores 224. The DBMS 216 may use any of a variety of database models (e.g., relational model, object model, etc.) and may support any of a variety of query languages. The DBMS 216 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the user device 105 is a mobile device, the DBMS 216 may be any suitable light-weight DBMS optimized for performance on a mobile device. Referring to the example types of data depicted as being stored in the datastore(s) 224, the data 226 may include kind of data that may be accessed by a user device 105, such as movies, music, application data generated by one or more application(s) 218 and associated with a user of the user device 105, etc. It should be appreciated that "data," as that term is used herein, includes computer-executable instructions, code, or the like.

Referring now to other illustrative components of the device 105, the one or more input/output (I/O) interfaces 208 may facilitate the receipt of input information by the device 105 from one or more I/O devices as well as the output of information from the device 105 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 105 or may be separate. The I/O devices may further include, for example, any number of peripheral devices such as data storage devices, printing devices, and so forth.

The I/O interface(s) 208 may also include an interface for an external peripheral device connection such as universal serial bus (USB), FireWire, Thunderbolt, Ethernet port or other connection protocol that may connect to one or more networks. The I/O interface(s) 208 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The user device 105 may further include one or more network interfaces 210 via which the user device 105 may communicate with any of a variety of other systems, platforms, networks, devices, and so forth. Such communication may occur via one or more networks including, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

Any of the user device(s) 105 may include one or more communications antennae (not pictured). Communications antenna may be any suitable type of antenna corresponding to the communications protocols used by the user device(s) 105. Some non-limiting examples of suitable communications antennas include Wi-Fi antennas, IEEE 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 105.

Any of the user device(s) 105 may include transmit/receive (transceiver) or radio components may include any suitable radio and/or transceiver for transmitting and/or receiving radio frequency (RF) signals in the bandwidth and/or channels corresponding to the communications protocols utilized by any of the user device(s) 105 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Those of ordinary skill in the art will appreciate that any of the components of the architecture depicted in the block diagram 200 may include alternate and/or additional hardware, software or firmware components beyond those described or depicted without departing from the scope of the disclosure. More particularly, it should be appreciated that software, firmware or hardware components depicted or described as forming part of any of the illustrative components of the architecture depicted in the block diagram 200, and the associated functionality that such components support, are merely illustrative and that some components may not be present or additional components may be provided in various embodiments. While various program modules have been depicted and described with respect to various illustrative components of the architecture depicted in the block diagram 200, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, firmware and/or hardware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative networked architecture depicted in the block diagram 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative architecture depicted in the block diagram 200, or additional functionality.

Illustrative Data and Process Flows

Figure 3:
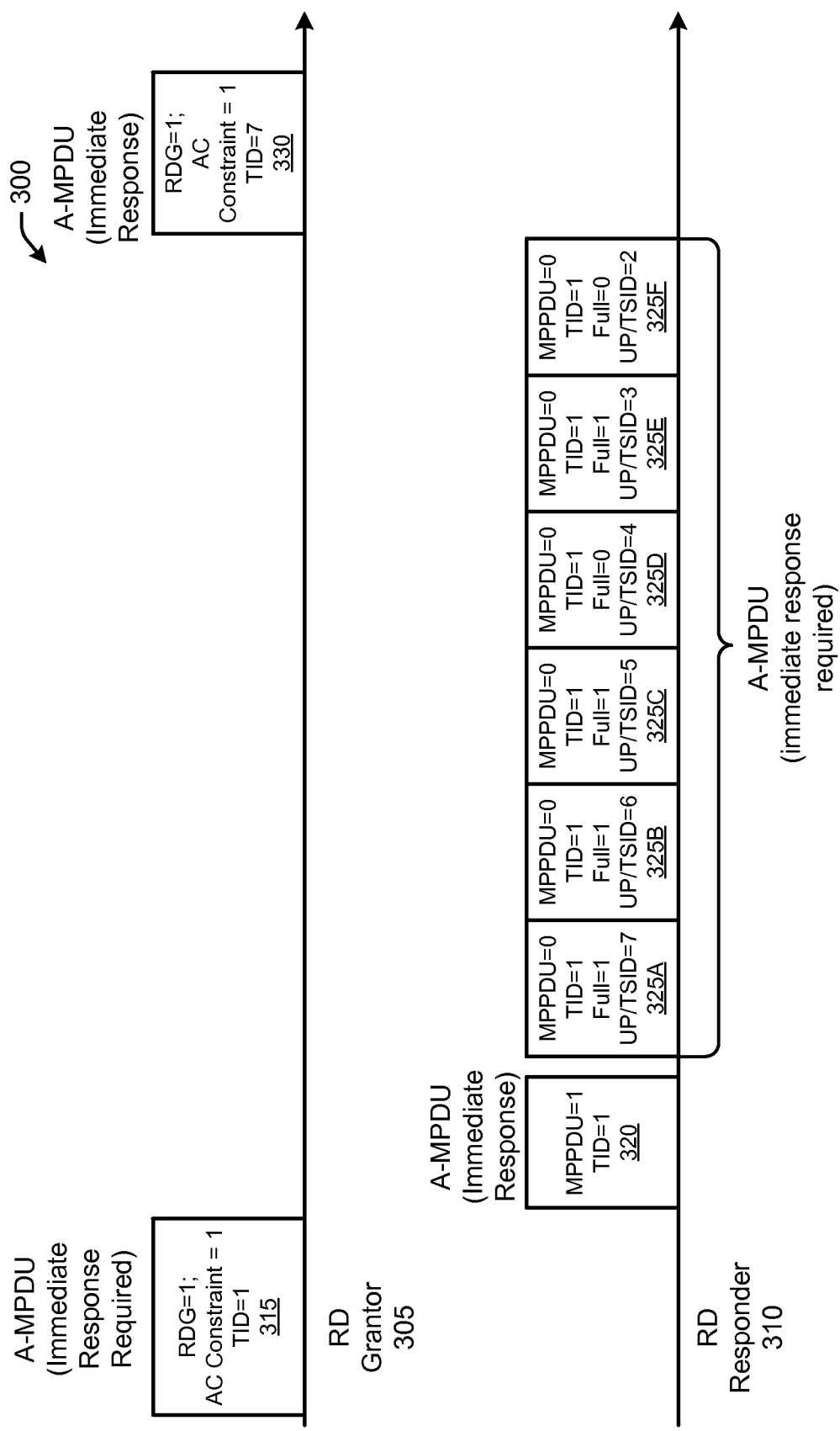
FIG. 3 is a data flow diagram of an illustrative method for cross indication of queue size in a reverse direction protocol in accordance with one or more embodiments of the disclosure.

FIG. 3 is a data flow diagram of an illustrative method 300 for cross indication of queue size in a reverse direction protocol in accordance with one or more embodiments of the disclosure. FIG. 3 is an illustrative example of delivery of the queue size information that is ready to be delivered between user devices 105, such as from a user device that is designated as an RD responder 310 to a user device 105 that is designated as an RD grantor 305 wherein the data is categorized by UP. An RD grantor 305 may be the user device 105 that holds a transmission opportunity (TxOP) and may grant time to the RD responder 310 during the TxOP to initiate a frame exchange sequence with the RD responder 310 in a wireless medium.

A first A-MPDU 315 may be generated by an RDP engine(s) 220 of the RD grantor 305 and transmitted to the RDP engine(s) 220 of the RD responder 310. The first A-MPDU 315 may be generated with an RDG field with a value set to 1, which may indicate that the RD grantor 305 is initiating a grant of time to the RD responder 310 during a transmission opportunity (TxOP) to initiate a frame exchange sequence with the RD responder 310 in a wireless medium. The first A-MPDU 315 may have an AC constraint field with the value set to 1, indicating that the response to an RDG may contain data frames only from the same AC as the last data frame received from the RD grantor 305. In some embodiments, the AC constraint field may have the value set to 0 which may be indicative that the response to an RDG may contain data frames from any TID. In some embodiments, the TID field may be set to the value of 1 which may indicate that the RD grantor 305 has granted to the RD responder 310 an RD grant for background traffic. Additionally, the A-MPDU 315 may specify that an immediate response is required.

In response to the RDP engine(s) 220 of the RD responder 310 receiving A-MPDU 315 from the RD grantor 305, the RDP engine(s) 220 of the RD responder 310 may generate and transmit A-MPDU 320 as an immediate response required by the A-MPDU 315 from the RD grantor 305. The RDP engine(s) 220 of the RD responder 310 may determine that, in response to receiving A-MPDU 315, there is data to be transmitted to the RD grantor 305. The RDP engine(s) 220 of the RD responder 310 may generate an A-MPDU comprising multiple sub-frames 325A-325F. Each sub-frame may comprise multiple fields, such as the MPPDU and TID. Additionally, the sub-frames 325A-325F may include sub-fields, as discussed herein, such as the full sub-field and the UP/TSID subfield. As discussed, if the full sub field is set to a value of 0, such as depicted in 325D and 325F, then there is not data associated with the respective sub-frame that needs to be transmitted to the RD grantor 305. If, however, the full sub-field is set to 1, then the RD responder 310 may evaluate the UP/TSID field to determine a priority or traffic stream associated with the data to be transmitted, which may be used to determine an order of data to be transmitted to the RD grantor 305 during the TxOP.

In response to receiving the A-MPDU associated with sub-frames 325A-325F, which indicates that an immediate response is required, the RDP engine(s) 220 of the RD grantor 305 may generate and transmit A-MPDU 330 as an immediate response to A-MPDU associated with sub-frames 325A-325F.

Figure 4:
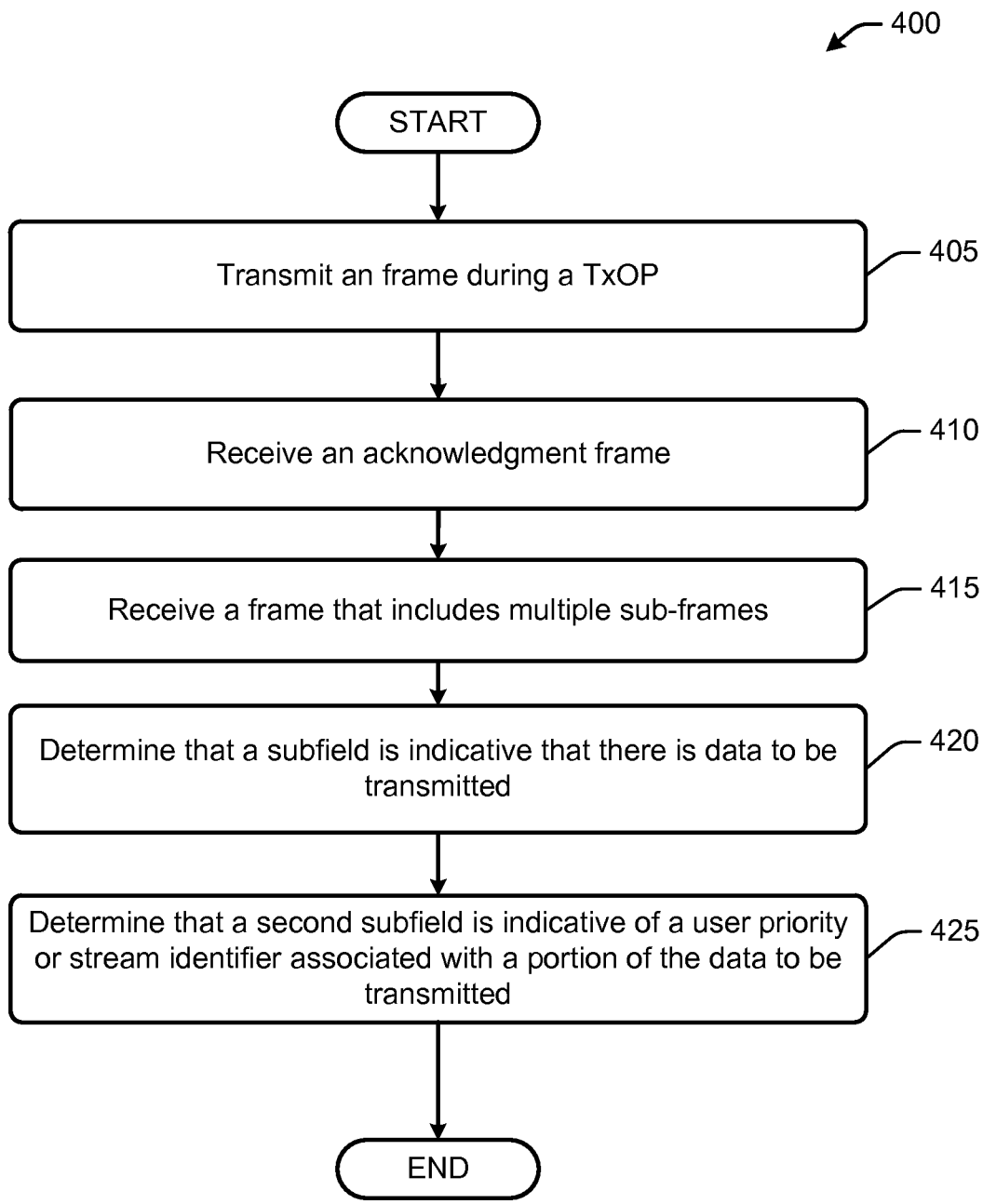
FIG. 4 is a process flow diagram of an illustrative method for a reverse direction grantor in a cross indication of queue size in a reverse direction protocol in accordance with one or more embodiments of the disclosure.

FIG. 4 is a process flow diagram of an illustrative method 400 for a reverse direction grantor in a cross indication of queue size in a reverse direction protocol in accordance with one or more embodiments of the disclosure. At block 405, an RD grantor 305 may generate and transmit a frame, such as A-MPDU 315, to an RD responder 310 during a TxOP. The A-MPDU 315 may indicate that the RD grantor 305 currently holds a transmission opportunity (TxOP) and is initiating a grant of time to the RD responder 310 during the TxOP to initiate a frame exchange sequence with the RD responder 310 in a wireless medium. At 410, the RD grantor 305 may receive an acknowledgment frame 320 from the RD responder 310 in response to the frame received in block 405. For instance, the acknowledgment frame 320 may be in response to the A-MPDU 315 requesting an immediate response.

At block 415, the RD grantor 305 may receive a frame (e.g., A-MPDU) that comprises or is otherwise associated with multiple sub-frames 325A-325F. In some embodiments, the frame may be multiple single MPDUs, each one containing the same information it contains being a sub-frame in an A-MPDU. In some embodiments, the sub-frames 325A-325F may be QoS data frames or QoS null frames. In some embodiments, the sub-frames 325A-325F may each include sub-fields that may be used to indicate to the RD grantor 305 a current state of data to be transmitted to the RD grantor 305 from the RD responder 310. At block 420, the RD grantor 305 may determine that a subfield of a sub-frame is indicative that there is data to be transmitted (e.g., received by the RD grantor 305). Then at block 425, if there is data to be transmitted based on, for example, evaluating the full sub-field of a sub-frame, the RD grantor 305 may evaluate the UP/TSID sub-field of the sub-frame to determine a priority or traffic stream associated with the data to be transmitted.

Figure 5:
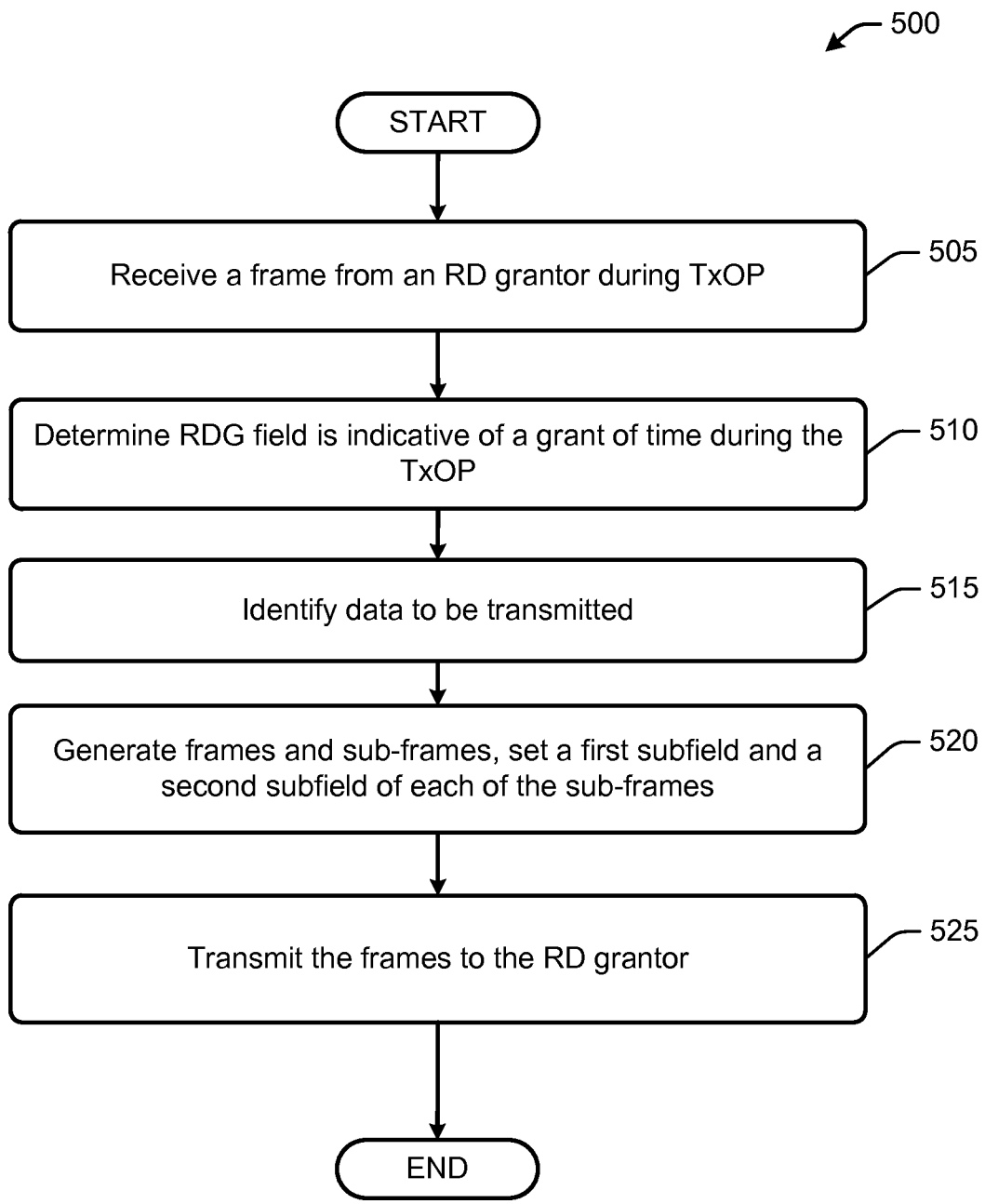
FIG. 5 is a process flow diagram of an illustrative method for a reverse direction responder cross indication of queue size in a reverse direction protocol in accordance with one or more embodiments of the disclosure.

FIG. 5 is a process flow diagram of an illustrative method 500 for a reverse direction responder in a cross indication of queue size in a reverse direction protocol in accordance with one or more embodiments of the disclosure. At block 505, the RD responder 310 may receive a frame (e.g., A-MPDU) from an RD grantor 305 during TxOP. At block 510, the RD responder 310 may determine that the frame indicates that the RD grantor 305 holds a transmission opportunity (TxOP) and is initiating a grant of time to the RD responder 310 during the TxOP to initiate a frame exchange sequence with the RD responder 310 in a wireless medium. The grant of time may be indicated in an RDG field. In some embodiments, the frame may also include a value in an AC constraint field that indicates that any data to be transmitted to the RD grantor 305 is constrained to the specified AC.

At block 515, the RDP engine(s) 220 of the RD responder 310 may identify data to be transmitted to the RD grantor 305 based on the data received in the frame received at block 505. At block 520, the RDP engine(s) 220 of the RD responder 310 may generate one or more frames (e.g., A-MPDU). The RDP engine(s) 220 may also generate multiple sub-frames associated with the frames. Each of the sub-frames may be a QoS data frame or a QoS null frame. The RDP engine(s) 220 may set a sub-field of the sub-frames to indicate whether there is data that can be transmitted to the RD grantor 305. In some embodiments, the sub-field may be the full sub-field, as described herein. The RDP engine(s) 220 may set the sub-field of full using a value of 0 if there is no data to be transmitted. The RDP engine(s) 220 may set the sub-field of full using a value of 1 if there is data to be transmitted to the RD grantor 305. If the full sub-field is set using the value 1, then the RDP engine(s) 220 may further set a second sub-field, the UP/TSID, to associate a priority or TS with the data to be transmitted to the RD grantor 305.

At block 525, the RDP engine(s) 220 of the RD responder 310 may transmit the frames (and sub-frames), generated at block 520, to the RD grantor 305. In some embodiments, the frame may specify that an immediate response is required and the RD grantor 305 may generate and transmit an acknowledgment frame to the RD responder 310 in response to receiving the frame (and sub-frames) at block 525. In some embodiments, multiple single MPDUs may be generated and transmitted to the RD responder.

In one embodiment, a computer-readable medium may store computer-executable instructions which, when executed by a processor, cause the processor to perform operations comprising receiving, by a first user device comprising one or more processors, a first frame from a second user device; determining, by the first user device, a value of a reverse direction grant (RDG) field of the first frame is indicative of the second user device initiating a grant of time to the first user device during a transmission opportunity (TxOP) to initiate a frame exchange sequence with the first device in a wireless medium; identifying, by the first user device, data to be transmitted to the second user device; generating, by the first user device, a second frame comprising a plurality of sub-frames, wherein each of the plurality of sub-frames is associated with a portion of the data to be transmitted; setting, by the first user device, a first value of a subfield of at least one of the plurality of sub-frames to indicate that there is data to be transmitted; setting, by the first user device, a second value of a second subfield to indicate a user priority or a traffic stream identifier associated with the portion of the data to be transmitted by the first user device; and transmitting, by the first user device, the second frame comprising the plurality of frames to the second user device.

In one aspect of an embodiment, the first frame and the second frame may comprise the plurality of frames are quality of service (QoS) frames. In one aspect of an embodiment, the first subfield may occupy bit 10 and the second subfield may occupy bits 11-14 in a QoS control field of each of the plurality of sub-frames. In one aspect of an embodiment, the first frame may comprise a request for an immediate response and the operations may further comprise generating, by the first user device, an acknowledgment frame; and transmitting by the first user device, the acknowledgment frame and the second frame comprising the plurality of sub-frames to the second user device as a block acknowledgment. In one aspect of an embodiment, the first frame may comprise an access category (AC) constraint field that is used to restrict a type of data transmitted to the second user device.

In one embodiment, a system may comprise at least one transceiver; at least one memory storing computer-executable instructions; and at least one processor, wherein the at least one processor may be configured to access the at least one memory and to execute the computer-executable instructions to receive a first frame from a user device; determine a value of a reverse direction grant (RDG) field of the first frame is indicative of the user device initiating a grant of time to the device during a transmission opportunity (TxOP) to initiate a frame exchange sequence with the device in a wireless medium; identify data to be transmitted to the user device; generate a second frame comprising a plurality of sub-frames, wherein each of the plurality of sub-frames is associated with a portion of the data to be transmitted; set a first value of a subfield of at least one of the plurality of sub-frames to indicate that there is data to be transmitted; set a second value of a second subfield to indicate a user priority or a traffic stream identifier associated with the portion of the data to be transmitted; and transmit the second frame comprising the plurality of sub-frames to the user device.

In one aspect of an embodiment, the first frame and the second frame may comprise the plurality of sub-frames are quality of service (QoS) frames. In one aspect of an embodiment, the first subfield may occupy bit 10 and the second subfield may occupy bits 11-14 in a QoS control field of each of the plurality of sub-frames. In one aspect of an embodiment, the first frame may comprise a request for an immediate response and wherein the at least one processor may be further configured to generate an acknowledgment frame; and transmit the acknowledgment frame and the second frame comprising the plurality of sub-frames to the second user device as a block acknowledgment. In one aspect of an embodiment, the first frame may comprise an access category (AC) constraint field that is used to restrict a type of data transmitted to the user device. In one aspect of an embodiment, the system may further comprise at least one antenna.

In one embodiment, a method may comprise receiving, by a first user device comprising one or more processors, a first frame from a second user device; determining, by the first user device, a value of a reverse direction grant (RDG) field of the first frame is indicative of the second user device initiating a grant of time to the first user device during a transmission opportunity (TxOP) to initiate a frame exchange sequence with the first device in a wireless medium; identifying, by the first user device, data to be transmitted to the second user device; generating, by the first user device, a second frame comprising a plurality of sub-frames, wherein each of the plurality of sub-frames is associated with a portion of the data to be transmitted; setting, by the first user device, a first value of a subfield of at least one of the plurality of sub-frames to indicate that there is data to be transmitted; setting, by the first user device, a second value of a second subfield to indicate a user priority or a traffic stream identifier associated with the portion of the data to be transmitted by the first user device; and transmitting, by the first user device, the second frame comprising the plurality of sub-frames to the second user device.

In one aspect of an embodiment, the first frame and the second frame may comprise the plurality of sub-frames are quality of service (QoS) frames. In one aspect of an embodiment, the first subfield may occupy bit 10 and the second subfield may occupy bits 11-14 in a QoS control field of each of the plurality of sub-frames. In one aspect of an embodiment, the first frame may comprise a request for an immediate response and the operations may further comprise generating, by the first user device, an acknowledgment frame; and transmitting by the first user device, the acknowledgment frame and the second frame comprising the plurality of sub-frames to the second user device as a block acknowledgment. In one aspect of an embodiment, the first frame may comprise an access category (AC) constraint field that is used to restrict a type of data transmitted to the second user device.

In one embodiment, an apparatus may comprise at least one transceiver; at least one memory storing computer-executable instructions; and at least one processor, wherein the at least one processor is configured to access the at least one memory and to execute the computer-executable instructions to transmit a first frame to a user device, wherein the first frame comprises a value of a reverse direction grant (RDG) field indicative of the apparatus initiating a grant of time to the user device during a transmission opportunity (TxOP) to initiate a frame exchange sequence in a wireless medium with the user device; receive, from the user device, a second frame comprising a plurality of sub-frames, wherein each of the plurality of sub-frames is associated with a portion of data to be transmitted; determine that a first value of a subfield of at least one of the plurality of sub-frames indicates that there is data to be transmitted; determine that a second value of a second subfield of the at least one of the plurality of sub-frames indicates a user priority or a traffic stream identifier associated with the portion of the data to be transmitted by the user device; and transmit an acknowledgment frame to the user device in response to receiving the second frame comprising the plurality of sub-frames.

In one aspect of an embodiment, the first frame and the second frame may comprise a plurality of sub-frames are quality of service (QoS) frames. In one aspect of an embodiment, the first subfield may occupy bit 10 and the second subfield may occupy bits 11-14 in a QoS control field of each of the plurality of sub-frames. In one aspect of an embodiment, the first frame may comprise a request for an immediate response and wherein the at least one processor may be further configured to receive a second acknowledgment frame and the second frame comprising the plurality of sub-frames from the user device as a block acknowledgment. In one aspect of an embodiment, the first frame may comprise an access category (AC) constraint field that is used to restrict a type of data received from the user device. In one aspect of an embodiment, the apparatus may comprise at least one antenna.

In one embodiment, a system may comprise a means for receiving a first frame from a second user device; a means for determining a value of a reverse direction grant (RDG) field of the first frame is indicative of the second user device initiating a grant of time to the first user device during a transmission opportunity (TxOP) to initiate a frame exchange sequence with the first device in a wireless medium; a means for identifying data to be transmitted to the second user device; a means for generating a second frame comprising a plurality of sub-frames, wherein each of the plurality of sub-frames is associated with a portion of the data to be transmitted; a means for setting a first value of a subfield of at least one of the plurality of sub-frames to indicate that there is data to be transmitted; a means for setting a second value of a second subfield to indicate a user priority or a traffic stream identifier associated with the portion of the data to be transmitted by the first user device; and a means for transmitting the second frame comprising the plurality of sub-frames to the second user device.

In one aspect of an embodiment, the first frame and the second frame may comprise the plurality of sub-frames are quality of service (QoS) frames. In one aspect of an embodiment, the first subfield may occupy bit 10 and the second subfield may occupy bits 11-14 in a QoS control field of each of the plurality of sub-frames. In one aspect of an embodiment, the first frame may comprise a request for an immediate response and the operations may further comprise a means for generating an acknowledgment frame; and a means for transmitting the acknowledgment frame and the second frame comprising the plurality of sub-frames to the second user device as a block acknowledgment. In one aspect of an embodiment, the first frame may comprise an access category (AC) constraint field that is used to restrict a type of data transmitted to the second user device.

In one embodiment, an apparatus may comprise at least one antenna; at least one transceiver; at least one memory storing computer-executable instructions; and at least one processor, wherein the at least one processor is configured to access the at least one memory and to execute the computer-executable instructions to receive a first frame from a user device; determine a value of a reverse direction grant (RDG) field of the first frame is indicative of the user device initiating a grant of time to the device during a transmission opportunity (TxOP) to initiate a frame exchange sequence with the device in a wireless medium; identify data to be transmitted to the user device; generate a second frame comprising a plurality of sub-frames, wherein each of the plurality of sub-frames is associated with a portion of the data to be transmitted; set a first value of a subfield of at least one of the plurality of sub-frames to indicate that there is data to be transmitted; set a second value of a second subfield to indicate a user priority or a traffic stream identifier associated with the portion of the data to be transmitted; and transmit the second frame comprising the plurality of sub-frames to the user device.

In one aspect of an embodiment, the first frame and the second frame may comprise the plurality of sub-frames are quality of service (QoS) frames. In one aspect of an embodiment, the first subfield may occupy bit 10 and the second subfield may occupy bits 11-14 in a QoS control field of each of the plurality of sub-frames. In one aspect of an embodiment, the first frame may comprise a request for an immediate response and wherein the at least one processor is further configured to generate an acknowledgment frame; and transmit the acknowledgment frame and the second frame comprising the plurality of sub-frames to the second user device as a block acknowledgment. In one aspect of an embodiment, the first frame may comprise an access category (AC) constraint field that is used to restrict a type of data transmitted to the user device.

In one embodiment, a system may comprise at least one antenna; at least one transceiver; at least one memory storing computer-executable instructions; and at least one processor, wherein the at least one processor is configured to access the at least one memory and to execute the computer-executable instructions to transmit a first frame to a user device, wherein the first frame comprises a value of a reverse direction grant (RDG) field indicative of the apparatus initiating a grant of time to the user device during a transmission opportunity (TxOP) to initiate a frame exchange sequence in a wireless medium with the user device; receive, from the user device, a second frame comprising a plurality of sub-frames, wherein each of the plurality of sub-frames is associated with a portion of data to be transmitted; determine that a first value of a subfield of at least one of the plurality of sub-frames indicates that there is data to be transmitted; determine that a second value of a second subfield of the at least one of the plurality of sub-frames indicates a user priority or a traffic stream identifier associated with the portion of the data to be transmitted by the user device; and transmit an acknowledgment frame to the user device in response to receiving the second frame comprising the plurality of sub-frames.

In one aspect of an embodiment, the first frame and the second frame may comprise the plurality of sub-frames are quality of service (QoS) frames. In one aspect of an embodiment, the first subfield may occupy bit 10 and the second subfield may occupy bits 11-14 in a QoS control field of each of the plurality of sub-frames. In one aspect of an embodiment, the first frame may comprise a request for an immediate response and wherein the at least one processor is further configured to generate an acknowledgment frame; and transmit the acknowledgment frame and the second frame comprising the plurality of sub-frames to the second user device as a block acknowledgment. In one aspect of an embodiment, the first frame may comprise an access category (AC) constraint field that is used to restrict a type of data transmitted to the user device.

A method may comprise transmitting, by a first user device comprising one or more processors, a first frame to a second user device, wherein the first frame comprises a value of a reverse direction grant (RDG) field indicative of the apparatus initiating a grant of time to the user device during a transmission opportunity (TxOP) to initiate a frame exchange sequence in a wireless medium with the second user device; receiving, by the first user device from the second user device, a second frame comprising a plurality of sub-frames, wherein each of the plurality of sub-frames is associated with a portion of data to be transmitted; determining, by the first user device, that a first value of a subfield of at least one of the plurality of sub-frames indicates that there is data to be transmitted; determining, by the first user device, that a second value of a second subfield of the at least one of the plurality of sub-frames indicates a user priority or a traffic stream identifier associated with the portion of the data to be transmitted by the second user device; and transmitting, by the first user device, an acknowledgment frame to the second user device in response to receiving the second frame comprising the plurality of sub-frames.

In one aspect of an embodiment, the first frame and the second frame may comprise a plurality of sub-frames are quality of service (QoS) frames. In one aspect of an embodiment, the first subfield may occupy bit 10 and the second subfield may occupy bits 11-14 in a QoS control field of each of the plurality of sub-frames. In one aspect of an embodiment, the first frame may comprise a request for an immediate response and wherein the method may further comprise receiving, by the first user device, a second acknowledgment frame and the second frame comprising the plurality of sub-frames from the second user device as a block acknowledgment. In one aspect of an embodiment, the first frame may comprise an access category (AC) constraint field that is used to restrict a type of data received from the second user device.

In one embodiment, a computer-readable medium may store computer-executable instructions which, when executed by a processor, cause the processor to perform operations comprising transmitting, by a first user device, a first frame to a second user device, wherein the first frame comprises a value of a reverse direction grant (RDG) field indicative of the apparatus initiating a grant of time to the user device during a transmission opportunity (TxOP) to initiate a frame exchange sequence in a wireless medium with the second user device; receiving, by the first user device from the second user device, a second frame comprising a plurality of sub-frames, wherein each of the plurality of sub-frames is associated with a portion of data to be transmitted; determining, by the first user device, that a first value of a subfield of at least one of the plurality of sub-frames indicates that there is data to be transmitted; determining, by the first user device, that a second value of a second subfield of the at least one of the plurality of sub-frames indicates a user priority or a traffic stream identifier associated with the portion of the data to be transmitted by the second user device; and transmitting, by the first user device, an acknowledgment frame to the second user device in response to receiving the second frame comprising the plurality of sub-frames.

In one aspect of an embodiment, the first frame and the second frame may comprise a plurality of sub-frames are quality of service (QoS) frames. In one aspect of an embodiment, the first subfield may occupy bit 10 and the second subfield may occupy bits 11-14 in a QoS control field of each of the plurality of sub-frames. In one aspect of an embodiment, the first frame may comprise a request for an immediate response and wherein the operations may further comprise receiving, by the first user device, a second acknowledgment frame and the second frame comprising the plurality of sub-frames from the second user device as a block acknowledgment. In one aspect of an embodiment, the first frame may comprise an access category (AC) constraint field that is used to restrict a type of data received from the second user device.

In one embodiment, a system may comprise a means for transmitting a first frame to a second user device, wherein the first frame comprises a value of a reverse direction grant (RDG) field indicative of the apparatus initiating a grant of time to the user device during a transmission opportunity (TxOP) to initiate a frame exchange sequence in a wireless medium with the second user device; a means for receiving, from the second user device, a second frame comprising a plurality of sub-frames, wherein each of the plurality of sub-frames is associated with a portion of data to be transmitted; a means for determining that a first value of a subfield of at least one of the plurality of sub-frames indicates that there is data to be transmitted; a means for determining that a second value of a second subfield of the at least one of the plurality of sub-frames indicates a user priority or a traffic stream identifier associated with the portion of the data to be transmitted by the second user device; and a means for transmitting an acknowledgment frame to the second user device in response to receiving the second frame comprising the plurality of sub-frames.

In one aspect of an embodiment, the first frame and the second frame may comprise a plurality of sub-frames are quality of service (QoS) frames. In one aspect of an embodiment, the first subfield may occupy bit 10 and the second subfield may occupy bits 11-14 in a QoS control field of each of the plurality of sub-frames. In one aspect of an embodiment, the first frame may comprise a request for an immediate response and wherein the system may further comprise a means for receiving a second acknowledgment frame and the second frame comprising the plurality of sub-frames from the second user device as a block acknowledgment. In one aspect of an embodiment, the first frame may comprise an access category (AC) constraint field that is used to restrict a type of data received from the second user device.

CONCLUSION

It should be appreciated that the program modules, applications, computer-executable instructions, code, or the like depicted in this disclosure as being stored in data storage are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on a device (e.g., user device 105), and/or hosted on other computing device(s) accessible via one or more networks, may be provided to support functionality provided by the program modules, applications, or computer-executable code depicted herein and/or additional or alternate functionality. Further, functionality may be modularized differently such that processing described as being supported collectively by the collection of program modules described herein may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules described herein may be implemented, at least partially, in hardware and/or firmware across any number of devices.

It should further be appreciated that a device (e.g., user device 105) may include alternate and/or additional hardware, software, or firmware components beyond those described or depicted without departing from the scope of the disclosure. More particularly, it should be appreciated that software, firmware, or hardware components depicted as forming part of the device (e.g., user device 105) are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods 400-500 may have been described above as being performed by one or more components of a device, or more specifically, by one or more program modules executing on such a device. It should be appreciated, however, that any of the operations of methods 400-500 may be performed, at least in part, in a distributed manner by one or more other devices or systems, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of any of the method 400-500 may be described in the context of the illustrative user device 105, it should be appreciated that such operations may be implemented in connection with numerous other system configurations.

The operations described and depicted in the illustrative methods of FIG. 4-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 4-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A device, the device is a first device, the first device comprising processing circuitry coupled to storage, the processing circuitry configured to:
   receive a first frame from a second device, wherein the first frame comprises a value of a reverse direction grant (RDG) field, wherein the value of the RDG field indicates that the second device initiated a grant of time to the first device during a transmission opportunity (TXOP) allocated to the second device to initiate a frame transmission by the first device on a wireless medium;
   identify an access category (AC) constraint field in the first frame, wherein the AC constraint field is set to a value of 1 or 0, wherein the value 1 indicates that a second frame is to comprise data from a same AC as a prior data frame received from the second device, and wherein the value of 0 indicates that the second frame is a frame associated with any traffic identifier (TID) in a TID field preceding the AC constraint field;
   generate the second frame comprising a plurality of sub-frames, wherein each of the plurality of sub-frames is associated with a portion of the data to be transmitted;
   set a first value of a first subfield of at least one of the plurality of sub-frames to indicate that the second frame contains queued data to be transmitted;
   set a second value of a second subfield of at least one of the plurality of sub-frames to indicate a user priority or a traffic stream identifier associated with the portion of the queued data to be transmitted; and
   cause to send the second frame to the second device on the wireless medium, wherein the second frame comprises the plurality of sub-frames.

2. The device of claim 1, wherein the first frame and the second frame are directional multi-gigabit (DMG) physical layer (PHY) protocol data unit (PPDU) frames.

3. The device of claim 1, wherein the first subfield and the second subfield are included in a quality of service (QoS) control field of the second frame.

4. The device of claim 3, wherein the TID field is located at bits 0-3 of the QoS control field of the second frame.

5. The device of claim 3, wherein the AC constraint field is located at bit 15 of the QoS control field of the second frame.

6. The device of claim 1, wherein the TID identifies a traffic category or a traffic stream associated with the TXOP.

7. The device of claim 1, further comprising a transceiver configured to transmit and receive wireless signals.

8. The device of claim 7, further comprising an antenna coupled to the transceiver to cause to send the second frame.

9. A non-transitory computer-readable medium storing computer-executable instructions which when executed by one or more processors of a first device result in performing operations comprising:
   receiving a first frame from a second device, wherein the first frame comprises a value of a reverse direction grant (RDG) field, wherein the value of the RDG field indicates that the second device initiated a grant of time to the first device during a transmission opportunity (TXOP) allocated to the second device to initiate a frame transmission by the first device on a wireless medium;

identifying an access category (AC) constraint field in the first frame, wherein the AC constraint field is set to a value of 1 or 0, wherein the value 1 indicates that a second frame is to comprise data from a same AC as a prior data frame received from the second device, and wherein the value of 0 indicates that the second frame is a frame associated with any traffic identifier (TID) in a TID field preceding the AC constraint field;

generating the second frame comprising a plurality of sub-frames, wherein each of the plurality of sub-frames is associated with a portion of the data to be transmitted;

setting a first value of a first subfield of at least one of the plurality of sub-frames to indicate that the second frame contains queued data to be transmitted;

setting a second value of a second subfield of at least one of the plurality of sub-frames to indicate a user priority or a traffic stream identifier associated with the portion of the queued data to be transmitted; and causing to send the second frame to the second device on the wireless medium, wherein the second frame comprises the plurality of sub-frames.

10. The non-transitory computer-readable medium of claim 9, wherein the first frame and the second frame are directional multi-gigabit (DMG) physical layer (PHY) protocol data unit (PPDU) frames.

11. The non-transitory computer-readable medium of claim 9, wherein the first subfield and the second subfield are included in a quality of service (QoS) control field of the second frame.

12. The non-transitory computer-readable medium of claim 11, wherein the TID field is located at bits 0-3 of the QoS control field of the second frame.

13. The non-transitory computer-readable medium of claim 11, wherein the AC constraint field is located at bit 15 of the QoS control field of the second frame.

14. The non-transitory computer-readable medium of claim 9, wherein the TID identifies a traffic category or a traffic stream associated with the TXOP.

15. A method comprising:
receiving, by one or more processors of a first device, a first frame from a second device, wherein the first frame comprises a value of a reverse direction grant (RDG) field, wherein the value of the RDG field indicates that the second device initiated a grant of time to the first device during a transmission opportunity (TXOP) allocated to the second device to initiate a frame transmission by the first device on a wireless medium;

identifying an access category (AC) constraint field in the first frame, wherein the AC constraint field is set to a value of 1 or 0, wherein the value 1 indicates that a second frame is to comprise data from a same AC as a prior data frame received from the second device, and wherein the value of 0 indicates that the second frame is a frame associated with any traffic identifier (TID) in a TID field preceding the AC constraint field;

generating the second frame comprising a plurality of sub-frames, wherein each of the plurality of sub-frames is associated with a portion of the data to be transmitted;

setting a first value of a first subfield of at least one of the plurality of sub-frames to indicate that the second frame contains queued data to be transmitted;

setting a second value of a second subfield of at least one of the plurality of sub-frames to indicate a user priority or a traffic stream identifier associated with the portion of the queued data to be transmitted; and causing to send the second frame to the second device on the wireless medium, wherein the second frame comprises the plurality of sub-frames.

16. The method of claim 15, wherein the first frame and the second frame are directional multi-gigabit (DMG) physical layer (PHY) protocol data unit (PPDU) frames.

17. The method of claim 15, wherein the first subfield and the second subfield are included in a quality of service (QoS) control field of the second frame.

18. The method of claim 17, wherein the TID field is located at bits 0-3 of the QoS control field of the second frame.

19. The method of claim 17, wherein the AC constraint field is located at bit 15 of the QoS control field of the second frame.

20. The method of claim 15, wherein the TID identifies a traffic category or a traffic stream associated with the TXOP.

* * * * *